United States Patent Office 2,821,520
Patented Jan. 28, 1958

2,821,520

UNSATURATED ESTERS OF ALKOXYBENZENE DICARBOXYLIC ACIDS AND POLYMERS THEREOF

Robert E. Burnett, Schenectady, N. Y., assignor to General Electric Company, a corporation of New York No Drawing. Application April 13, 1956
Serial No. 578,147

8 Claims. (Cl. 260—47)

This invention relates to unsaturated esters of aromatic dicarboxylic acids and to polymers thereof. More particularly, this invention is concerned with a specific class of unsaturated esters of alkoxybenzene dicarboxylic acids and with polymers prepared therefrom.

Heretofore, it has been proposed to form unsaturated esters of certain types of aromatic dicarboxylic acids and to polymerize these unsaturated esters by conventional methods employed in polymerizing unsaturated materials. Specifically, it has been proposed to prepare unsaturated esters such as the mono- or di-vinyl or allyl esters of benzene dicarboxylic acids such as phthalic acid, isophthalic acid or terephthalic acid and to polymerize the resulting monomeric esters with conventional olefinic hydrocarbon polymerizing agents such as, for example, benzoyl peroxide. However, when these vinyl or allyl esters of benzene dicarboxylic acids have been formed and the esters have been polymerized, it is found that the resulting polymer does not have the desired degree of hydrolytic stability.

I have now discovered that mono- or divinyl or mono- or diallyl esters of alkoxybenzene dicarboxylic acids may be formed and that the resulting esters may be polymerized readily with conventional olefinic hydrocarbon polymerization catalysts to form high polymeric materials which are useful in commercial resin applications and which have a higher degree of hydrolytic stability than corresponding polymers prepared from benzene dicarboxylic acid esters. This particular class of vinyl or allyl esters is defined by the following formula (1) 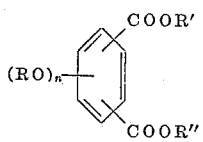

where R is a lower alkyl radical, e. g., an alkyl radical containing from 1 to 4 carbon atoms such as, for example, methyl, ethyl, propyl, sec-butyl, etc., radicals; R' is a member selected from the class consisting of vinyl and allyl radicals; and R" is a member selected from the class consisting of hydrogen, vinyl radicals, and allyl radicals; and $n$ is an integer equal to from 1 to 3, inclusive.

The esters within the scope of Formula 1 may be formed by conventional methods from the corresponding acid. The acids which are employed to form the esters within the scope of Formula 1 include, for example, 3-methoxyphthalic acid, 4 - methoxyphthalic acid, 2 - methoxyisophthalic acid, 4 - methoxyisophthalic acid, 5 - methoxyisophthalic acid, methoxyterephthalic acid, 4-ethoxyphthalic acid, 5-propoxyisophthalic acid, butoxyterephthalic acid, 2,4-dimethoxyisophthalic acid, 4,6 - dimethoxyisophthalic acid, etc. The preferred type of alkoxybenzene dicarboxylic acid within the scope of the present invention is the methoxybenzene dicarboxylic acid with the preferred specific acid being methoxyterephthalic acid.

These monomethoxybenzene dicarboxylic acids may be defined by the following formula (2) 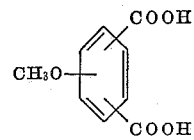

The mono- or divinyl or mono- or diallyl esters of the monomethoxybenzene dicarboxylic acids are described by the following formula (3) 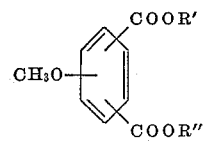

where R' and R" are as defined.

The alkoxybenzene dicarboxylic acids which are employed in the practice of my invention are known materials and may be prepared by a number of different methods. One of these methods comprises the formation of dimethylanisole from a dimethyl phenol and then oxidizing the two methyl groups to carboxylic acid groups.

These vinyl or allyl esters of the alkoxybenzene dicarboxylic acids may be formed in conventional methods from acetylene in the case of the vinyl esters and from allyl alcohol in the case of the allyl esters. Thus, the monovinyl and divinyl esters of an acid such as, for example, methoxyterephthalic acid may be formed by passing acetylene through liquid methoxyterephthalic acid at a temperature of about 220° C. in the presence of mercuric sulfate. The monovinyl and divinyl esters of terephthalic acid will be swept out of the reaction mixture by unreacted acetylene and then may be collected in a suitable condenser. The monoallyl and diallyl esters of any of these acids, for example, of methoxyterephthalic acid, may be formed by heating a mixture of methoxyterephthalic acid and allyl alcohol in the presence of a suitable esterification catalyst such as, for example, d-camphor sulfonic acid and heating the reaction mixture until esterification has taken place. The mono- and diesters may be separated from each other by conventional methods such as, for example, fractional distillation or fractional crystallization from a suitable solvent. The monovinyl or monoallyl esters of the present invention are crystalline materials at room temperature while the divinyl or diallyl esters are liquids at room temperature.

Since the esters of the present invention contain olefinic unsaturation, the esters may be polymerized with conventional olefin polymerization methods. Thus, these esters may be polymerized by photochemical means, by irradiation with high energy electrons or atomic fission products, by peroxide and hydroperoxide catalysts, and by other catalysts such as nitrogen-containing and sulfur-containing catalysts. Specific examples of catalytic reagents which may be employed to effect the polymerization include, for example, free radical initiators such as benzoyl peroxide, bis-(2,4-dichlorobenzoyl) peroxide, lauroyl peroxide, bis-(p-chlorobenzoyl) peroxide, acetyl benzoyl peroxide, peracetic acid, hydroxyheptyl peroxide, isopropyl percarbonate, methyl ethyl ketone peroxide, cyclohexanone peroxide, cyclohexyl hydroperoxide, cumene hydroperoxide, di-γ-cumyl peroxide, t-butyl hydroperoxide, methyl amyl ketone peroxide, acetyl peroxide, methyl cyclohexyl hydroperoxide, t-butyl permaleic acid, t-butyl perbenzoate, di-t-butyl diperphthalate, t-butyl perphthalic acid, p-chlorobenzoyl peroxide, t-butyl peracetate, di-t-butyl peroxide, dibenzal diperoxide, γ, γ'-azodiisobutyronitrile, potassium persulfate, etc.

In carrying out the reaction, the vinyl or allyl ester is mixed with the desired amount of catalyst and the reaction mixture is maintained at an elevated temperature until the desired degree of polymerization has occurred. The amount of catalyst may vary within wide limits, for example, from about 0.5 to 10 percent by weight of catalyst based on the weight of the ester. The preferred catalyst range is from about 1 to 5 percent by weight of catalyst based on the weight of the ester. The reaction temperatures vary with the particular catalyst employed, the concentration of catalyst and the particular ester being employed. However, satisfactory results are obtained with the preferred range of from 1 to 5 percent by weight of catalysts when temperatures of from about 100–150° C. are employed for the polymerization. At this temperature, polymerization of the reaction mixture takes place at a relatively rapid rate and polymerization is generally completed within 3 to 4 hours after the catalyzed reaction mixture is brought up to reaction temperature.

Regardless of whether the ester is a monoester or a diester, the initial polymerization reaction is the formation of a polymer characterized by the following recurring structural units (4)

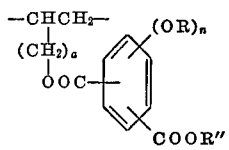

where R, R'' and $n$ are as previously defined and $a$ is one of the following: 0, 1. From the above formula, it is obvious that when the ester is a vinyl ester, $a$ is equal to 0 and that when the ester is an allyl ester, $a$ is equal to 1.

During the course of the polymerization reaction, as the number of structural units per molecule begins to increase such as an increase of from 1 to 30 or more units, the resulting product becomes more and more viscous until at high molecular weights a solid, fusible material is obtained which, because of its thermoplastic properties may be extruded around electrical conductors, formed into sheets, and used in the same manner as other more conventional fusible resinous materials. When the R'' radical of the esters of this invention are hydrogen, the resulting polymeric materials are not readily cross-linked so that the material retains its fusible or thermoplastic characteristics. However, when the R'' radical is a vinyl or allyl radical, it is seen that additional reactive sites are available for cross-linking the resin. Therefore, if the linear graft polymer is maintained at an elevated temperature in the presence of a free radical initiator, further polymerization will take place which will result in a cross-linked infusible solid transparent product.

If a polymeric material having the recurring units described by Formula 4 in which R'' is hydrogen is reacted with a polyhydric alcohol or a polyamine such as ethylene glycol or hexamethylene diamine, it is seen that the resulting material will be cross-linked with ester or amide linkages yielding a polymeric material containing a number of long chains which are cross-linked with ester or amide linkages to provide a polymeric material useful for encasing transformers and other electrical devices.

In addition to forming homopolymers of the esters of the present invention, it is also possible to copolymerize these esters with other monomeric or polymeric materials containing olefinic unsaturation. Thus, these esters can be polymerized with unsaturated alkyd resins to form new materials having properties which make them suitable for molding, coating and adhesive applications. Thus, these esters can be polymerized with unsaturated alkyd resins prepared from ethylene glycol and maleic anhydride, diethylene glycol and itaconic acid, glycerol and itaconic acid, glycerol and maleic anhydride, etc.

The following examples are illustrative of the practice of my invention and are not intended for purposes of limitation. All parts are by weight.

*Example 1*

A mixture of 1 part of d-camphor sulfonic acid, 98 parts of methoxy terephthalic acid and 2150 parts of allyl alcohol were added to a reaction vessel and heated to a temperature of about 140° C. At this temperature the allyl alcohol which boiled away from the reaction mixture was periodically condensed and returned to the reaction mixture. To the reaction vessel was connected a porous vessel containing anhydrous calcium sulfate which absorbed water formed from the alcoholysis reaction. This reaction was continued for a period of 8 hours, at which time the reaction mixture was cooled to room temperature. The reaction mixture was then filtered, and a stream of nitrogen was swept through the filtrate to remove most of the unreacted allyl alcohol. The residual allyl alcohol was removed from the reaction mixture by evacuation at 40–50° C. at 1 mm. for 40 minutes. This resulted in a mixture of monoallyl methoxyterephthalate and diallyl terephthalate.

The monoallyl methoxyterephthalate was separated from the reaction mixture with dilute aqueous sodium bicarbonate and precipitated from the bicarbonate solution by acidifying with HCl. The precipitate was recrystallized from hot cyclohexane to yield substantially poor monoallyl methoxyterephthalate. This material had a melting point of 108.6° C. The identity of the monoallyl methoxyterephthalate was further corroborated by an equivalent weight determination which gave an equivalent weight of 232 as compared with the theoretical value of 236.2. The ester showed a weight gain when treated with bromine vapor which amounted to 42.6 percent bromine as compared with the theoretical value of 40.4 percent bromine.

The residue from the extraction of the monoallyl methoxyterephthalate with the bicarbonate was an oily material which was dissolved in benzene. This benzene solution was swept with a slow stream of nitrogen to remove the benzene leaving a clear, light brown oil which was purified by fractional evaporation at 160° C. and 1 mm. The diallyl methoxyterephthalate had a refractive index $n_D^{20}$ of 1.5327. The identity of this material was corroborated by bromination which gave a bromine content of 53.5 percent as compared with the theoretical value of 53.6 percent. Chemical analysis of the diallyl methoxyterephthalate showed the presence of 64.7 percent carbon and 6.3 percent hydrogen as compared with the theoretical values of 65.2 percent carbon and 5.8 percent hydrogen.

*Example 2*

This example describes the polymerization of diallyl methoxyterephthalate. A 1 percent by weight solution of benzoyl peroxide in diallyl methoxyterephthalate was heated at a temperature of about 100–110° C. After about 6½ hours polymerization occurred yielding a hard, transparent polymer. This polymer could be dissolved in m-cresol to form a solution having a solids content of about 25 percent by weight. The resulting solution could then be cast into a film and after evaporation of the solvent a flexible transparent film was obtained. Similarly, this 25 percent solids solution could be applied to a copper conductor, and after evaporation of the solvent, a conductor containing a tough, flexible, adherent insulation coating is obtained.

*Example 3*

In order to evaluate the differences between the allyl esters of terephthalic acid and the allyl esters of methoxyterephthalic acid, the procedure employed in Example 1 to prepare the allyl esters of methoxyterephthalate acid was repeated with terephthalic acid substituted for methoxyterephthalic acid. After heating this terephthalic acid reaction mixture at a temperature of about 140° C. for 8 hours, it was found that very little of the methoxyterephthalic acid went into solution. After maintaining this reaction mixture at temperature for 8 hours, the white powder remaining in the reaction mixture was filtered and weighed. This showed that the unreacted terephthalic acid amounted to about 93 percent of the acid initially charged to the reaction vessel. Under these same conditions (Example 1) over 90 percent of the methoxyterephthalic acid entered into the reaction. This indicates that the methoxyterephthalic acid is much more reactive with the allyl alcohol than the conventional terephthalic acid.

Although the foregoing examples do not describe all of the possible vinyl or allyl esters of the alkoxybenzene dicarboxylic acid within the scope of the present invention, it should be understood that any of the alkoxybenzene dicarboxylic acids within the scope of Formula 1 may be substituted for the methoxyterephthalic acid illustrated in the examples. Furthermore, the proportions of ingredients employed in the reaction mixture may also differ from those specifically described in the example to provide vinyl or allyl esters of alkoxybenzene dicarboxylic acids. All of these vinyl or allyl esters may be polymerized with the free radical initiators described to yield tough, transparent, polymeric materials which are valuable for use as laminating agents, adhesives, film-forming agents, and molding resins.

Although the invention has been described only in terms of alkoxybenzene dicarboxylic acid esters containing only one type of alcoholic nucleus, it should be understood that mixed esters are also contemplated. Thus, mixed esters within the scope of the present invention include, for example, vinyl allyl methoxyterephthalate, vinyl allyl 5-propoxyisophthalate, etc.

What I claim as new and desire to secure by Letters Patent of the United States is:

1. An unsaturated ester of an alkoxybenzene dicarboxylic acid having the formula

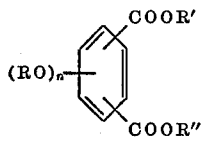

where R is an alkyl radical containing from 1 to 4 carbon atoms, R' is a member selected from the class consisting of vinyl and allyl radicals, R" is a member selected from the class consisting of hydrogen, vinyl radicals and allyl radicals and $n$ is an integer equal to from 1 to 3, inclusive.

2. As a composition of matter, the monoallyl ester of methoxyterephthalic acid.

3. A composition of matter comprising the diallyl ester of methoxyterephthalic acid.

4. A resinous composition of matter comprising the recurring structural unit

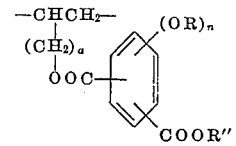

where R is an alkyl radical containing from 1 to 4 carbon atoms, R" is a member selected from the class consisting of hydrogen, vinyl radicals, and allyl radicals, $n$ is an integer equal to from 1 to 3, inclusive, and $a$ is one of the following: 0, 1.

5. The method of forming a polymeric material which comprises heating, in the presence of a free-radical initiator, an alkoxybenzene dicarboxylic acid ester having the formula

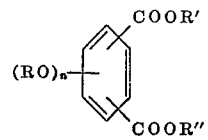

where R is an alkyl radical containing from 1 to 4 carbon atoms, R' is a member selected from the class consisting of vinyl radicals and allyl radicals, R" is a member selected from the class consisting of hydrogen, vinyl radicals and allyl radicals, and $n$ is an integer equal to from 1 to 3, inclusive.

6. The method of forming a polymeric material which comprises heating diallyl methoxyterephthalate in the presence of a free radical initiator.

7. The method of claim 6 in which the free radical initiator is benzoyl peroxide.

8. The polymeric material prepared by the process of claim 7.

References Cited in the file of this patent

UNITED STATES PATENTS 2,501,610    Morris et al. _____ Mar. 21, 1950

OTHER REFERENCES

Burkhard et al., J. Org. Chem. 21, 1226–7 (November 1956).